United States Patent [19]
Hamrick

[11] Patent Number: 5,259,418
[45] Date of Patent: Nov. 9, 1993

[54] HEAT RESHAPEABLE REGID CONDUIT

[76] Inventor: James C. Hamrick, Rte. 3, Box 244, Kings Mountain, N.C. 28086

[21] Appl. No.: 670,952

[22] Filed: Mar. 18, 1991

[51] Int. Cl.⁵ ...................... F16L 55/00; F16L 11/14; F16L 11/20
[52] U.S. Cl. ..................... 138/104; 138/103; 138/131; 138/134; 138/135; 138/137; 138/139; 138/DIG. 8; 138/122; 174/68.3; 116/207
[58] Field of Search ............... 138/104, DIG. 8, 121, 138/134–136, 139, 177, 178, 137, 140; 116/207, 216; 72/364, 369; 264/285; 428/35.8, 34.9, 913; 174/68.3; 4/DIG. 7; 285/179

[56] References Cited

U.S. PATENT DOCUMENTS

| | | | |
|---|---|---|---|
| 591,092 | 10/1897 | Brooks | 138/DIG. 8 |
| 1,731,322 | 10/1929 | Riddle | 138/139 |
| 2,044,900 | 6/1936 | Debenedetti | 138/136 |
| 2,480,774 | 8/1949 | Rossheim et al. | |
| 2,927,625 | 3/1960 | Rothermel | 138/139 |
| 3,204,666 | 9/1965 | Lindsay | 138/139 |
| 3,282,300 | 11/1966 | Kinander | 138/139 |
| 3,311,133 | 3/1967 | Kinander | 138/139 |
| 3,771,570 | 11/1973 | Coleman | 138/139 |
| 3,892,912 | 7/1975 | Hauck | 174/68.3 |
| 3,965,715 | 6/1976 | Parmann | |
| 4,013,873 | 3/1977 | Olson | 174/68.3 |
| 4,144,632 | 3/1979 | Stroupe | 138/DIG. 8 |
| 4,156,588 | 5/1979 | Miller et al. | |
| 4,299,105 | 11/1981 | Whitworth | |
| 4,306,819 | 12/1981 | Schusseler | 138/DIG. 8 |
| 4,334,121 | 6/1982 | Kutnyak | 174/68.3 |
| 4,403,631 | 9/1983 | Abdullaev | 138/130 |
| 4,464,923 | 8/1984 | Boggs et al. | |
| 4,487,232 | 12/1984 | Kanao | |
| 4,620,569 | 11/1986 | von Glastatten et al. | |
| 4,657,049 | 4/1987 | Fourty et al. | |
| 4,669,508 | 6/1987 | Neaves | 138/DIG. 8 |
| 4,800,928 | 1/1989 | Kanao | 138/122 |
| 4,862,924 | 9/1989 | Kanao | 138/122 |
| 4,899,787 | 2/1990 | Ouchi et al. | |
| 4,903,735 | 2/1990 | Delacour et al. | |
| 4,915,139 | 4/1990 | Landry | 428/34.9 |
| 4,966,202 | 10/1990 | Bryan | 138/DIG. 8 |

Primary Examiner—Harvey C. Hornsby
Assistant Examiner—Randall E. Chin
Attorney, Agent, or Firm—Bell, Seltzer, Park & Gibson

[57] ABSTRACT

A heat reshapeable rigid conduit and method for forming an elbow or offset having any desired bend radius therefrom. The rigid conduit is formed of a flexible metal tubing with a layer of heat softenable plastic preferably covering the exterior surface thereof. The conduit may be heated using conventional electric heaters on the job site, then shaped into the desired bend radius to form an elbow or offset. The plastic layer provides rigidity to the elbow or offset upon cooling. The flexible metal tubing has interlocking overlapping joined edges that permit flexing of the tubing when the plastic layer is heat softened. The flexible metal tubing resists the sawing action of a pulling line during the installation of an electrical conductor in the conduit. The plastic outer layer permits quick and inexpensive coupling between adjacent conduit sections. The heat reshapeable rigid conduit may be formed by extruding a plastic coating on the exterior of the flexible tubing, or may be formed by frictionally fitting a length of flexible metal tubing inside a length of plastic tubing. A section of the rigid conduit may also be heated and extended to correct for any error in measurement or cutting.

21 Claims, 5 Drawing Sheets

HEAT RESHAPEABLE REGID CONDUIT

FIELD OF THE INVENTION

This invention relates to the field of conduits used for the placement and protection of electrical conductors and the like, and more particularly to a rigid conduit that may be readily formed into any desired bend radius.

BACKGROUND OF THE INVENTION

Conduit systems are typically used for the routing and protection of electrical conductors and the like. For example, conduits are frequently used to provide a protective path for electrical, or communications, cables within a building. Conduits may also be buried in the ground to provide connections from an existing electric utility distribution system to a particular building or building complex.

National safety codes and local building codes often dictate when a metal or plastic conduit may be used in conjunction with an electrical conductor. For example, less expensive plastic conduit is often permitted to be buried in the ground and used to bring electrical service from an underground electrical feeder to indoor power equipment. The plastic conduit, typically polyvinyl chloride (PVC), is supplied in straight lengths. A straight length of PVC conduit may be heat softened and formed into a desired bend radius, such as needed for rounding corners or for avoiding obstacles in a buried installation. The heating and forming may be accomplished at the job site using readily available conventional electric portable heaters and conduit bending jigs.

A conduit system for providing electrical service typically enters a building through a vertical penetration in the building floor. The conduit then must be continued in a vertical direction up to a wall mounted junction box, for example. The point where the conduit extends beyond the surface of the floor is an especially vulnerable point for damage to the conduit. PVC conduit may be readily damaged in such an exposed condition. Building construction is often not complete when the conduit is set in the concrete floor. Therefore, building crews may inadvertently break a PVC conduit near the floor surface level. The damage is often difficult to repair. In recognition of the vulnerability of PVC conduit if installed extending from a concrete floor, many codes do not permit PVC to be used in such an application.

A rigid metal conduit elbow positioned beneath the floor of the building and extending through the floor is an alternative to the PVC conduit elbow. The rigid metal conduit elbow is more rugged than its PVC counterpart. Unfortunately, this increased ruggedness translates into greater material, handling and installation expenses. For example, metal conduits are often formed into elbows using bending jigs. Smaller size conduits may be bent without a bending jig; however, crimping of the conduit may frequently occur requiring discarding of the crimped conduit. Larger size conduits are typically bent to a desired radius with a jig. Typically, however, one jig will not be effective for all sizes of conduit used by an installation contractor. Therefore, an expensive assortment of metal conduit bending jigs must be purchased, maintained, and transported to each job site.

Rigid metal conduits also require more expensive fittings to interconnect adjacent sections than do PVC conduits. PVC conduit sections may be readily interconnected by inexpensive plastic couplings and readily secured with a welding solvent applied to the end of the conduit and the inner surface of the coupling. In addition, a rigid metal conduit may also require expensive threading tools, the additional labor of threading the ends prior to connection to adjacent lengths, and more powerful saws to cut the rigid metal conduit.

A further disadvantage of PVC conduit is that it may readily be sawed through by the action of a pulling line as typically used for pulling an electrical conductor into the conduit. This sawing action is greatest at the elbows or offsets. Oftentimes, the elbow or offset will be encased in concrete to strengthen the PVC and minimize the damage to the conduit during installation of the cable. If the conduit is already buried beneath the earth or is in another relatively difficult location to access, repair of a damaged conduit section can be expensive and time consuming.

SUMMARY OF THE INVENTION

In light of the foregoing discussion, it is therefore an object of the present invention to provide a rigid conduit which may be readily formed into any desired bend radius.

It is another object of the present invention to provide a conduit which is sufficiently rugged to be positioned so as to extend beyond the level of a building floor.

It is a further object of the present invention to provide a conduit which has an inner surface that resists the sawing action of pulling line during the installation of a conductor within the conduit.

It is yet another object of the present invention to provide a conduit which may readily connected to an adjacent conduit section using relatively simple and inexpensive couplers.

These and other objects of the present invention are provided by a heat reshapeable rigid conduit that may be readily formed into any desired bend radius to make an elbow or an offset. The elbow or offset may then receive an electrical conductor and the like therethrough. The heat reshapeable rigid conduit may also be advantageously incorporated in a conduit system as a straight section.

The rigid conduit is formed of a flexible metal tubing having an interior surface and an exterior surface with a rigid layer of heat softenable plastic covering at least one of these surfaces. The rigid layer imparts rigidity to a formed elbow and maintains the elbow in a predetermined bend radius during the passage therethrough of an electrical conductor. In a preferred embodiment according to the invention, the plastic layer covers the exterior of the flexible tubing. As would be readily understood by those skilled in the art, the elbow may also be formed with a rigid layer of heat softenable plastic covering the interior surface of the flexible tubing, or covering both the interior and exterior of the flexible tubing.

The flexible tubing may preferably be formed of a spirally wound metal ribbon with overlapping interlocking joined edges. The overlapping edges permit flexing of the spiral metal tubing when the rigid plastic layer is heat softened. The rigid plastic tubing is preferably PVC and may include an identifying indicia thereon for indicating the heat softening temperature of the plastic PVC material.

The rigid heat softenable conduit may also include a layer of relatively low coefficient of friction plastic lining the interior of the flexible tubing. The low coefficient of plastic layer will reduce friction during the passage therethrough of an electrical conductor. Alternatively, the rigid heat reshapeable conduit may include an inner lining of abrasive resistant material to further protect the flexible metal tubing from abrasion.

The conduit may be supplied as a rigid straight tubing that may be readily heated and shaped at the job site. Conduit elbows or offsets of any desired bend radius may be readily formed according to the method of the present invention. The rigid conduit is first heated to soften the rigid plastic layer, and then the conduit may be shaped into the desired bend radius prior to the cooling and rigidification of the heat softened plastic layer.

The rigid tubing may preferably be formed of a flexible metal tubing formed of a spirally wound metal ribbon having overlapping interlocking joined edges. The exterior of the flexible tubing may be covered with a layer of rigid heat softenable plastic. As would be readily understood by those having skill in the art, the heat softenable plastic layer may be extruded as a coating over the flexible tubing. The rigid tubing may also be formed by frictionally fitting the flexible metal tubing within a rigid heat softenable plastic tubing.

The rigid tubing may preferably be formed with the flexible tubing in a predetermined state of longitudinal extension or compaction. The flexible tubing includes overlapping joined edges that may be fully extended, partially extended, or fully compacted. When the heat softenable plastic layer is formed on the flexible tubing with the overlapping edges being adjacent, the rigid tubing is fully extended and may then be compacted when the rigid plastic layer is heat softened. When the plastic layer is formed on the flexible tubing with the overlapping edges defining a spacing therebetween, the rigid tubing is fully compacted and may then be subsequently extended upon heat softening of the plastic layer.

A conduit system may be formed by providing and coupling together a plurality of conduit sections. At least one of the conduit sections may be formed of a flexible metal tubing with a heat softenable rigid plastic layer covering the exterior thereof. This section may be heated to soften the rigid plastic layer and this heat softened conduit section may then be shaped into a desired bend radius. As would be readily understood by those having skill in the art, the plurality of conduit sections may be assembled in end-to-end relation and secured by a suitable PVC adhesive and conventional PVC coupling sleeves.

A method according to the present invention allows the correction, in the field, of a section of conduit that is cut too short for its intended span between adjacent conduit sections. The rigid conduit section is extensible and is formed of a flexible tubing with overlapping interlocking joined edges that having a spacing therebetween. The too-short conduit section is heated and extended to the proper length by the application of a tensile force to the ends of the conduit section. The corrected conduit section may then be placed in line with the adjacent conduit sections and secured thereto.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, applicant provides these embodiments so that this disclosure will be thorough and complete, and will fully convey the scope of the invention to those skilled in the art. Like numbers and prime notation are used to refer to like elements throughout.

Figures 1, 2, 3, 4:
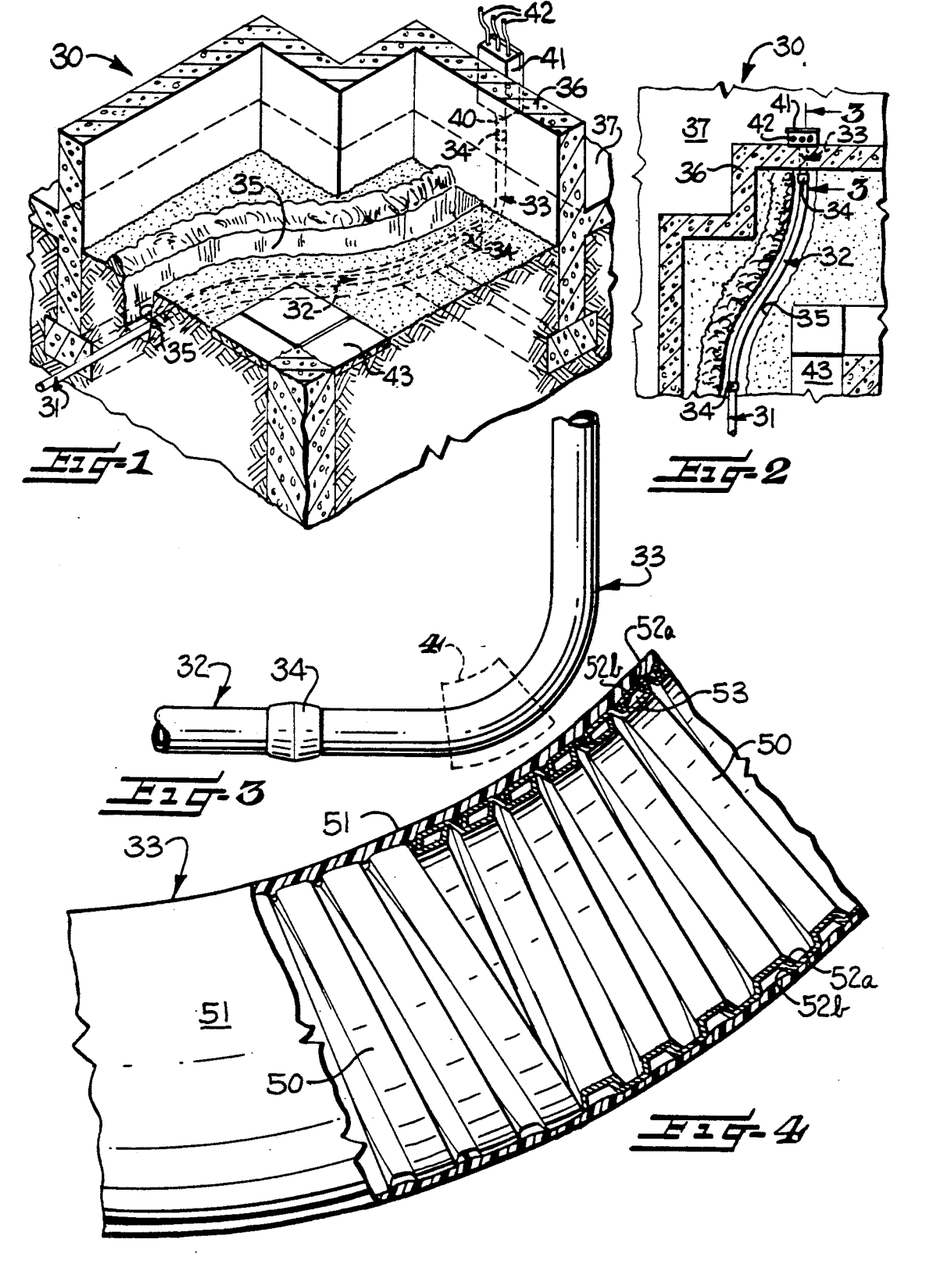
FIG. 1 is a schematic perspective view of a conduit system according to the present invention.
FIG. 2 is a plan view of FIG. 1.
FIG. 3 is a side elevational view of a heat reshapeable rigid conduit formed into an elbow as shown in FIG. 2 along lines 3—3.
FIG. 4 is an enlarged cutaway view of section 4 shown in FIG. 3.

FIGS. 1 and 2 illustrate a portion of a typical conduit system generally designated as 30. As would be readily understood by those having skill in the art, the conduit system 30 may be used for the routing and protection of an electric conductor, communications cable and the like, not shown. The conduit system 30 may include a straight section of conduit 31, an offset 32, an elbow 33, and couplings 34 for interconnecting adjacent conduit sections. The outdoor portion of the conduit system 30 may be placed in a trench 35 which is later backfilled to complete the buried portion of the conduit installation.

The conduit system 30 may typically enter a building through a penetration in the building sidewall 36 and then make a 90° turn to pass vertically through the building floor 37. A conduit elbow 33 is typically used to make the 90° change in direction. A short section of straight rigid or flexible conduit 40 may be used to connect the elbow 33 to a wall-mounted electrical junction box 41. Electrical conductors 42 may then be extended from the electric junction box 41 throughout the building, as required.

In addition to the single bend required in the conduit system 30 provided by the conduit elbow 33, a series of bends may also be required as provided by an offset 32. An offset 32 may typically be required to avoid obstacles, such as an existing paved walkway 43 as shown. As would be readily understood by those skilled in the art, a conduit system 30 having the basic components as described above may be entirely contained within a building or structure rather than including a buried portion buried in a trench 35 as shown.

Referring to FIGS. 3 and 4, there is shown an embodiment of a heat reshapeable conduit elbow 33 according to the present invention. The conduit elbow 33 of the present invention includes an inner flexible metal tubing 50 with a layer 51 of heat softenable plastic covering the exterior of the flexible tubing 50. The flexible tubing 50 is preferably formed of a spirally wound metal ribbon with overlapping interlocking joined edges 52a, 52b. The interlocking joined edges 52a, 52b permit flexing of the tubing 50 when the outer plastic layer 51 is heat softened. The interlocking edges 52a, 52b overlap and define a gap 53 therebetween on the inner radial portion of the elbow 33. On the outer radial portion of the elbow 33, the overlapping edges 52a, 52b are adjacent, that is fully extended with no intervening spacing. As would be readily understood by those skilled in the art, the degree of spacing between overlapping edges 52a, 52b on the inner and outer radial portions of the elbow 33 is dependent upon the bend radius of the elbow and the specific construction of the flexible tubing 50.

The heat softenable plastic layer 51 may be polyvinyl chloride (PVC), such as PVC marketed as GEON ® 8714 or 8761 by the BFGoodrich Company, Geon Vinyl Division, of Cleveland, Ohio. The flexible metal tubing 50 may be a "Type SL" (square-locked) galvanized steel flexible tubing such as made by Anamet Inc. of Waterbury Conn.

By providing an elbow 33 with an inner metallic tubing, the elbow 33 according to the present invention is well suited to resist any sawing action imparted by the passage of a pulling line and electrical conductor through the elbow 33. Since the conduit elbow 33 has a PVC outer covering, readily available and relatively inexpensive PVC adhesive and couplers may be used to join adjacent conduit sections. The heat reshapeable rigid conduit according to the present invention synergistically combines the advantages of a metal conduit with the advantages of a PVC conduit while overcoming the disadvantages of each.

Referring to FIGS. 5 through 12, there are shown various embodiments of portions of rigid tubing according to the present invention used for forming elbows 33 or offsets 32 of any desired bend radius. The rigid tubing may be supplied to the job site in straight lengths of about 10 feet each. Typical sizes for the diameter of the tubing corresponds to commercially available PVC conduits ranging in size from about ½" to 6" in diameter.

Figure 5:
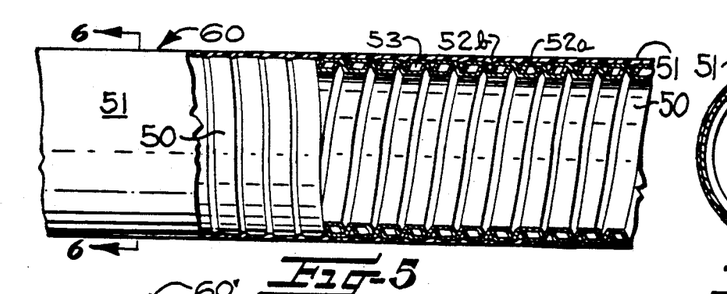
FIG. 5 is a fragmentary cutaway view of a heat reshapeable rigid conduit embodiment according to the present invention.
Figure 6:
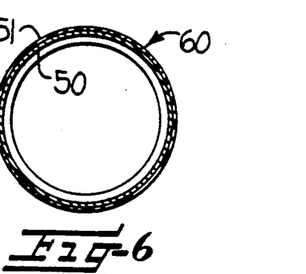
FIG. 6 is a cross-sectional view of the rigid conduit shown in FIG. 5 along lines 6—6.
Figure 10:
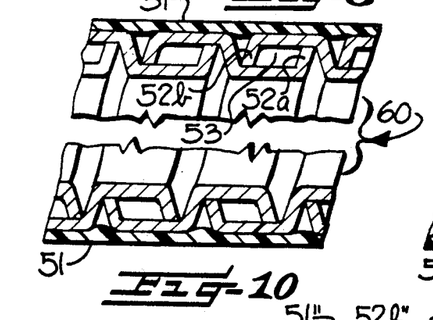
FIG. 10 is an enlarged fragmentary cross-sectional view of the conduit embodiment as shown in FIG. 5.

FIGS. 5 and 10 illustrate a heat reshapeable rigid tubing 60 formed with the interlocking overlapping joined edges 52a, 52b fully compacted thereby defining a gap 53 between the overlapping edges. The rigid tubing 60 may be formed by extruding the plastic layer 51 on the flexible tubing 50 with the tubing in the fully compacted condition. As an alternative to extruding the plastic layer 51, it may also be molded around the flexible tubing 50. When the rigid tubing 60 is heated and bent into a desired bend radius, for example to form an elbow 33 (FIGS. 3 and 4), the gap 53 will remain between overlapping edges 52a, 52b of the inner radial portion of the elbow 33, and the gap will be closed on the outer radial portion.

Figure 7:
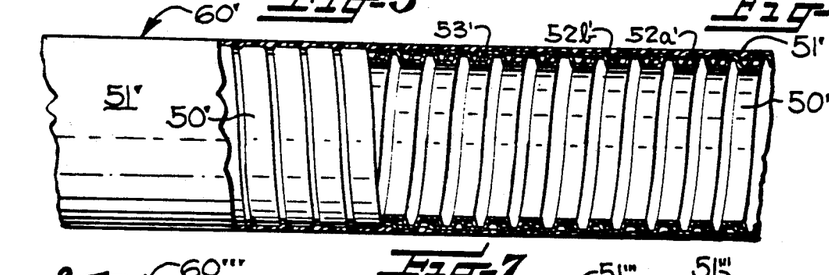
FIG. 7 is a fragmentary cutaway view of another embodiment of a rigid heat reshapeable conduit according to the present invention.
Figure 11:
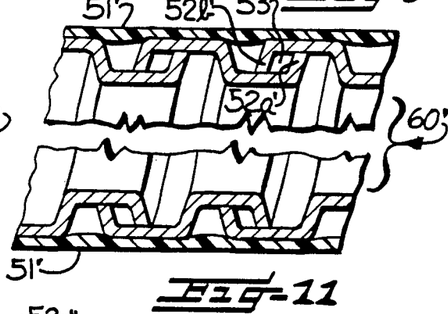
FIG. 11 is an enlarged fragmentary cross-sectional view of the conduit embodiment as shown in FIG. 7.

Another embodiment of the rigid tubing 60', shown in FIGS. 7 and 11, may be formed wherein the overlapping joined edges 52a',52b' are partially overlapped thereby defining a narrower gap 53' between adjacent edges 52a',52b'. This embodiment of heat reshapeable rigid tubing 60' may have its outer plastic layer 51' heat softened and the tubing 60' may then be longitudinally extended or compacted to adjust the length thereof.

Figure 12:
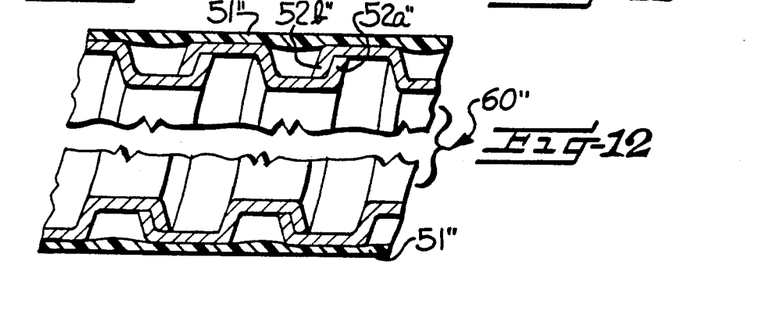
FIG. 12 is an enlarged fragmentary cross-sectional view of yet a further embodiment of a heat reshapeable rigid conduit according to the present invention.

A further embodiment of the rigid tubing 60" is illustrated in FIG. 12. The joined edges 52a",52b" are adjacent, that is, the tubing 60" is fully extended so that no spacing or gap exists between the adjacent joined edges. When the outer plastic layer 51" is heat softened the tubing 60" may be compacted to reduce its length.

Figure 8:
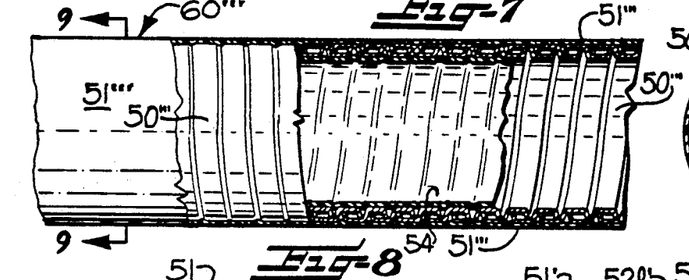
FIG. 8 is a fragmentary cutaway view of a further embodiment of a heat reshapeable rigid conduit according to the present invention.
Figure 9:
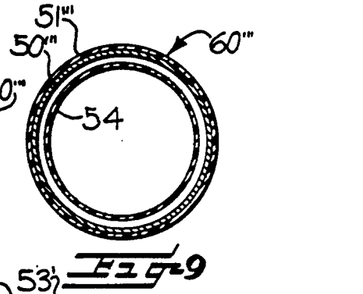
FIG. 9 is a cross-sectional view of the rigid conduit shown in FIG. 8 along lines 9—9.

FIGS. 8 and 9 illustrate another embodiment according to the present invention wherein the heat reshapeable rigid tubing 60''' includes an inner liner 54, in addition to the plastic layer 51''' and the flexible metal tubing 50'''. This liner 54 may be a smooth plastic with a low coefficient of friction so as to reduce friction during the installation of an electrical conductor within the liner 54. The low coefficient of friction plastic liner 54 may either be flexible or may have a heat softening temperature compatible with that of the outer plastic layer 51'''. The inner liner 54 may also serve to seal the metal tubing 50''' or provide a smooth surface to aid in blowing a pull string through the conduit 60'''. Alternately, the liner 54 may be an abrasive resistant layer to resist the sawing action of a pulling line and conductor as the conductor is pulled into the conduit 60'''. The abrasive resistant layer may be formed of a suitable material, such as PVC impregnated with a metal powder to thereby resist abrasion.

While the embodiments of rigid tubing with a heat softenable plastic layer described above have concentrated on a rigid outer layer of heat softenable plastic, it would be readily understood by those having skill in the art that the plastic layer may be on the inner surface of the flexible tubing, or that the plastic layer may cover both the inner and outer surfaces of the flexible tubing.

Figure 15:
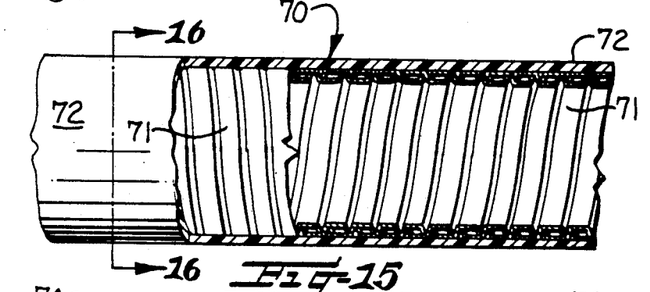
FIG. 15 is a fragmentary cutaway view of the embodiment of the heat reshapeable rigid conduit shown in FIG. 14 along lines 15—15.
Figure 16:
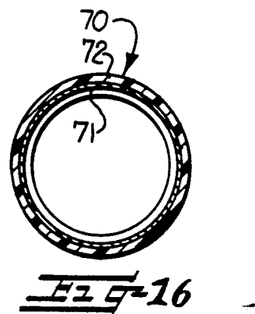
FIG. 16 is a cross-sectional view of the rigid conduit embodiment shown in FIG. 15 along lines 16—16.

A rigid heat reshapeable tubing 70 as shown in FIG. 15 may be fabricated by inserting a flexible metal tubing 71 into a length of plastic tubing 72. The flexible metal tubing 70 is retained in the plastic tubing 72 by a friction fit. It is envisioned the length of such a rigid tubing 70 is also desirably kept shorter than other embodiments formed by extruding or molding the plastic layer onto the flexible tubing. For example, a 2 foot length may be preferred for a 2 inch diameter tubing, so that the flexible metal tubing 71 may be readily inserted into the plastic tubing 72.

Figures 13, 14:
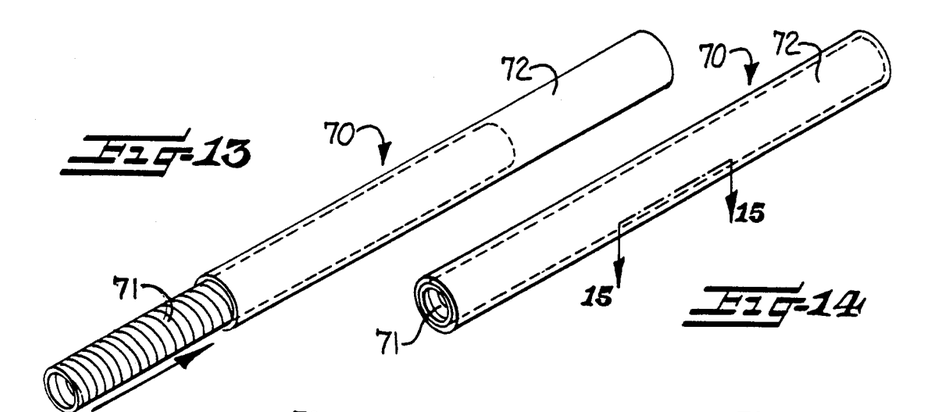
FIGS. 13 and 14 are schematic views illustrating method steps in making an embodiment of a heat reshapeable rigid conduit according to the present invention.
Figure 17:
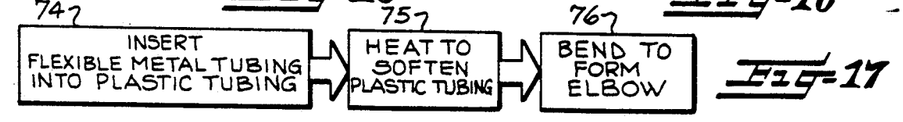
FIG. 17 is a flowchart for the method steps of forming an elbow from a plastic and flexible metal tubing as shown in FIG. 14.
Figures 18, 19:
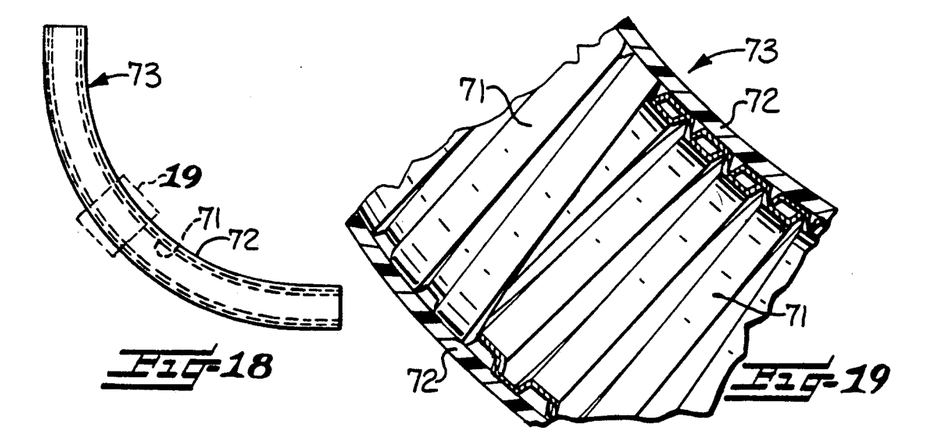
FIG. 18 is a side elevational view of a conduit elbow formed according to the method steps of FIG. 17.
FIG. 19 is an enlarged cross-sectional view of section 19 as shown in FIG. 18.

The rigid tubing 70 may also be formed into a standard industry elbow 73 (FIGS. 17 through 19) prior to shipment to the job site. The method of forming an elbow from the plastic tubing 72 and flexible metal tubing 71, shown in FIG. 13, is illustrated by the flowchart of FIG. 17. The flexible metal tubing 71 is first inserted into the plastic tubing 72 (Block 74), then the plastic tubing is heated to soften the plastic at Block 75, and then the tubing may be bent into the desired bend radius to form the elbow 73 (Block 76). The plastic tubing 72 becomes rigid again upon cooling.

Referring to FIGS. 20 through 24, there is shown a method of forming an elbow or an offset with a desired bend radius for joining it to adjacent conduit sections to form a conduit system, such as illustrated in FIG. 1. A section of heat reshapeable rigid tubing 60, as described above, is first measured and cut to a desired length (Block 80). The cut length of rigid tubing 60 is then heated (Block 81) using a conventional portable electric heater 86, such as the type used to soften PVC conduit at a job site. It is anticipated that an adequate heat softening of the tubing may be achieved in several minutes or less, depending on the size of the conduit, using a conventional electric heater 86. The heated tubing 60 may then be bent and shaped into a desired configuration (Block 82). For example, the heated tubing 60 may be formed into an elbow with a 90 bend, or more than one bend may be formed in the tubing to form an offset. As would be readily understood by those having skill in the art, an appropriate bending jig 87,88 may be used to help bend and shape the heat softened tubing 60.

Figure 20:
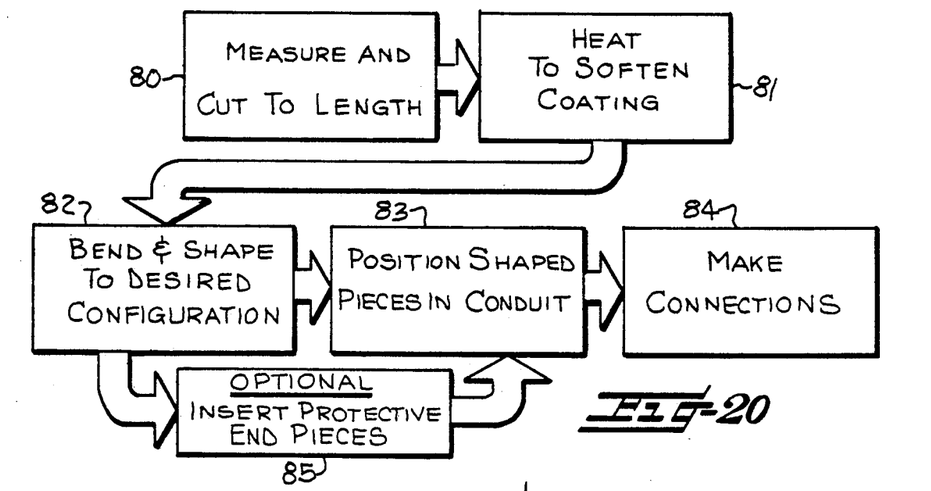
FIG. 20 is a flowchart illustrating a method of making a conduit system according to the present invention.
Figures 21, 22:
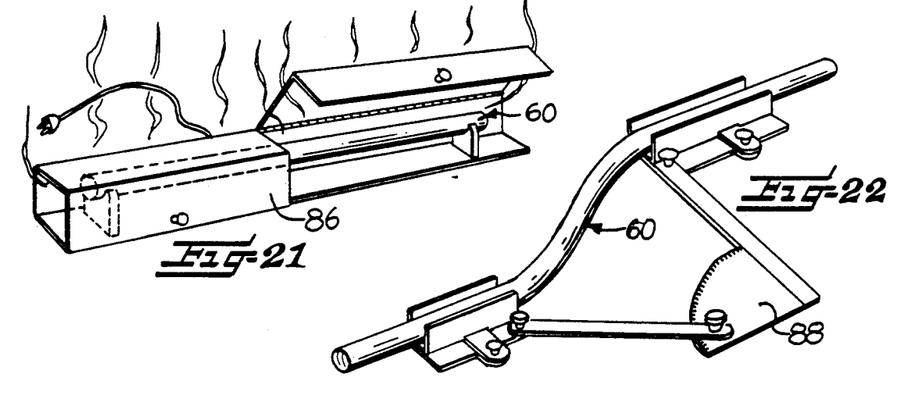
FIG. 21 is a schematic perspective view of a length of conduit being heated according to the method of the present invention.
FIG. 22 is a schematic perspective view of a heat softened conduit being formed into an offset according to the method of the present invention.
Figures 23, 24:
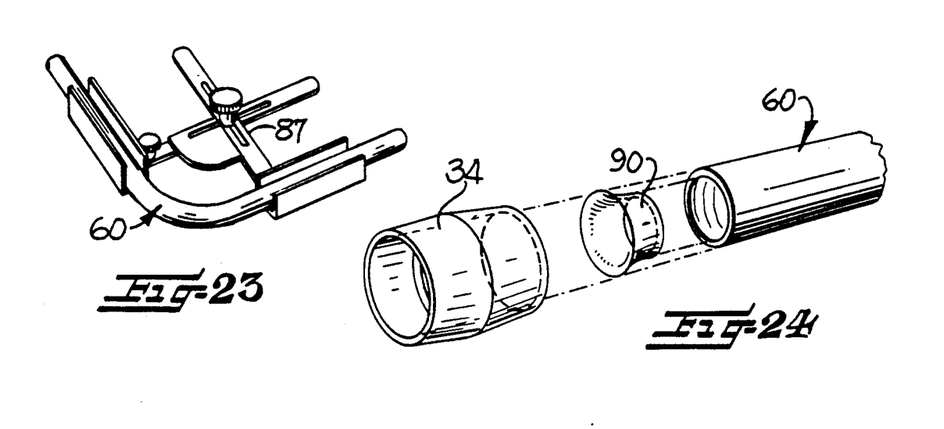
FIG. 23 is a schematic perspective view of a heat softened conduit being formed into an elbow according to the method of the present invention.
FIG. 24 is a schematic exploded perspective view of a conduit and interconnection fitting according to the present invention.

Protective end pieces 90 may be inserted into the ends of the tubing 60 to protect against abrasion caused by the exposed cut edge of the flexible metal tubing (Block 85). The shaped conduit section may then be positioned at the desire position in the conduit system (Block 83). Connections between adjacent conduit sections may then be made (Block 84) by applying an adhesive to the ends of the conduits and sliding a readily available PVC sleeve coupler 34 thereover to complete the connection.

Figure 25:
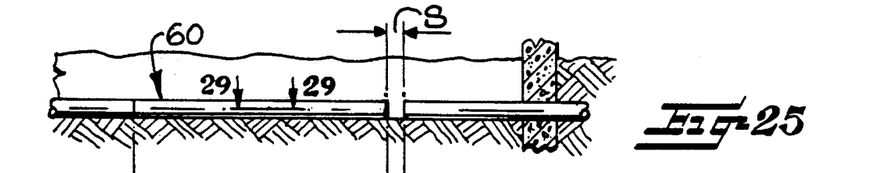
FIGS. 25 through 28 are schematic side elevational views of a conduit system having a section of conduit cut too short and a method of correcting same.
Figure 26:
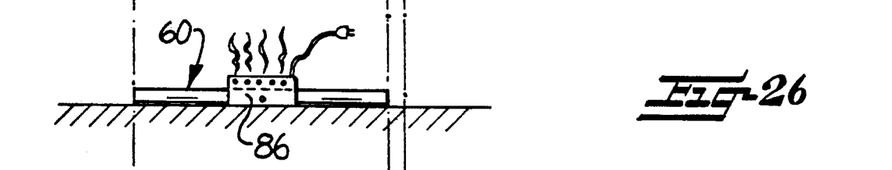
Figure 27:
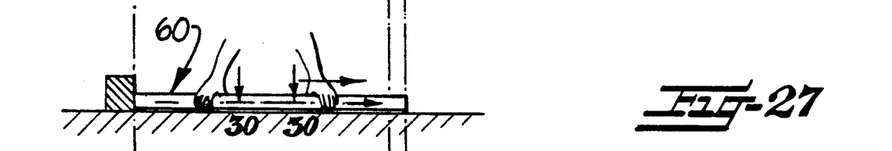
Figure 28:
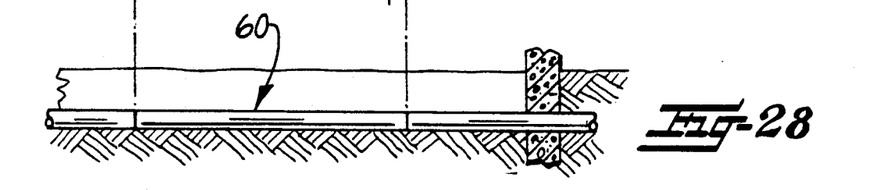
Figure 29:
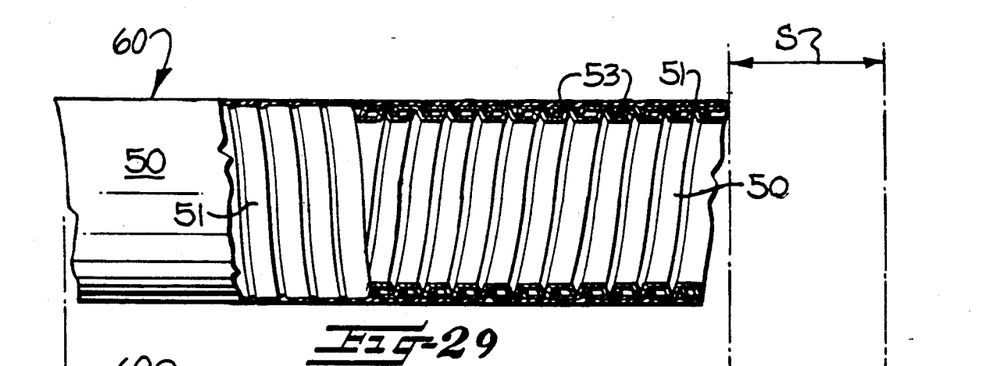
FIG. 29 is an enlarged fragmentary cutaway view of the conduit section shown in FIG. 25.
Figure 30:
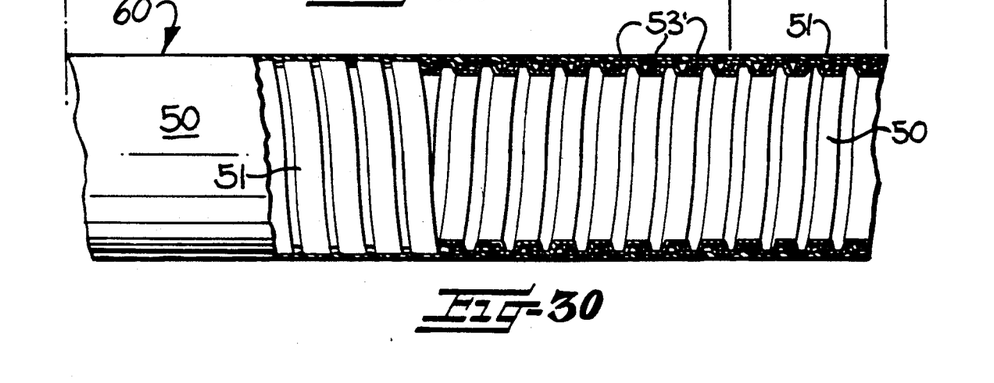
FIG. 30 is an enlarged fragmentary cutaway view of the conduit section shown in FIG. 28.

FIGS. 25 through 30 illustrate a method of correcting for an error in measurement or cutting of a section of conduit 60 wherein the conduit section is too short to span the desired distance between conduit sections. If the rigid heat reshapeable tubing is cut too short by a distance S as illustrated in FIG. 25, it may be heated (FIG. 26) to soften the plastic layer, and then stretched by a tensile force applied to the ends thereof to extend the tubing 60 to the desired length (FIG. 27). As shown in FIGS. 29 and 30, the gap 53 between the overlapping joined edges 52a,52b is reduced to a smaller gap 53' as the tubing 60 is extended. The tubing 60, after being extended to the proper length, may then be fitted and secured to the adjacent conduit sections as shown in FIG. 28.

While the product and methods according to the present invention have been illustrated with respect to a rigid heat reshapeable conduit for use with an electrical conductor, it would be readily understood that the conduit may used to transport fluids, liquids or other materials. It would also be readily understood that the layer of heat softenable plastic may serve not only to provide rigidity to the overall conduit section, but may also serve to protect the metal tubing from a corrosive atmosphere, such as typical in a water treatment plant, or other chemical operations, or for residential applications near large bodies of water.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A conduit elbow adapted for installation of an electrical conductor and the like therethrough, said elbow comprising:

a flexible tubing having an interior surface and an exterior surface;

a rigid layer of heat softenable and reshapeable plastic covering at least one of said surfaces of said flexible tubing, said rigid layer imparting rigidity to the elbow and preventing bending thereof to thus maintain the elbow in a predetermined bend radius during the passage therethrough of an electrical conductor, said rigid plastic layer when heated permitting change in the bend radius of the elbow.

2. The conduit elbow according to claim 1 wherein said rigid layer of heat softenable and reshapeable plastic covers at least the exterior surface of said flexible tubing.

3. The conduit elbow according to claim 1 wherein said rigid layer of heat softenable and reshapeable plastic covers at least the interior surface of said flexible tubing.

4. The conduit elbow according to claim 1 wherein said flexible tubing comprises a spirally wound metal ribbon with overlapping interlocking joined edges, and wherein said joined edges permit flexing of said spiral metal tubing when said rigid plastic layer is heat softened.

5. The conduit elbow according to claim 1 wherein said rigid layer of heat softenable and reshapeable plastic comprises polyvinyl chloride.

6. The conduit elbow according to claim 1 wherein said rigid plastic layer includes an identifying indicia thereon for indicating the heat softening temperature of the plastic layer.

7. A conduit elbow adapted for installation of an electrical conductor and the like therethrough, said elbow comprising:

a flexible tubing;

a rigid layer of heat softenable and reshapeable plastic covering the exterior of said flexible tubing and imparting rigidity to the elbow, said rigid layer preventing bending of the elbow to thus maintain the elbow in a predetermined bend radius during the passage therethrough of an electrical conductor, said rigid plastic layer when heated permitting change in the bend radius of the elbow.

8. The conduit elbow according to claim 7 wherein said flexible tubing comprises a spirally wound metal ribbon with overlapping interlocking joined edges, and wherein said joined edges permit flexing of said spiral metal tubing when said rigid plastic layer is heat softened.

9. The conduit elbow according to claim 7 further comprising a layer of relatively low coefficient of friction plastic lining the interior of said flexible tubing to reduce friction during the passage therethrough of an electrical conductor.

10. The conduit elbow according to claim 7 further comprising a layer of abrasive resistant material lining the interior of said flexible tubing.

11. The conduit elbow according to claim 7 wherein said rigid layer of heat softenable and reshapeable plastic comprises polyvinyl chloride.

12. The conduit elbow according to claim 7 wherein said rigid layer of heat softenable and reshapeable plastic includes an identifying indicia thereon for indicating the heat softening temperature of the plastic.

13. A rigid tubing adapted for forming conduit elbows of any desired bend radius therefrom, said tubing comprising:
a flexible tubing having an interior surface and an exterior surface;
a rigid layer of heat softenable and reshapeable plastic covering at least one of said surfaces of said flexible tubing and imparting rigidity thereto and preventing bending thereof, said rigid plastic layer having a relatively low heat softening point so that said rigid plastic layer may be readily heat softened for forming an elbow having any desired bend radius therefrom with the formed elbow being rigid upon cooling of the heat softened plastic layer said rigid plastic layer when heated also permitting change in the bend radius of the formed elbow.

14. The rigid tubing according to claim 13 wherein said rigid plastic layer covers the exterior of said flexible tubing.

15. The rigid tubing according to claim 13 wherein said flexible tubing comprises a spirally wound metal ribbon with interlocking joined edges, and wherein said joined edges permit flexing of said spiral metal tubing when said rigid plastic layer is heat softened.

16. The rigid tubing according to claim 15 wherein said joined edges of said flexible tubing are overlapped with a spacing therebetween so as to permit longitudinal extension of said rigid tubing when said rigid plastic layer is heat softened.

17. The rigid tubing according to claim 15 wherein said joined edges of said flexible tubing are overlapped, and wherein said overlapped edges are adjacent so as to permit longitudinal compaction of said rigid tubing when said rigid plastic layer is heat softened.

18. The rigid tubing according to claim 13 wherein said rigid plastic layer comprises polyvinyl chloride.

19. The rigid tubing according to claim 13 wherein said rigid plastic layer includes an identifying indicia thereon for indicating the heat softening temperature of the plastic.

20. The rigid tubing according to claim 13 further comprising a layer of abrasive resistant material lining the interior of said flexible tubing.

21. The conduit elbow according to claim 13 further comprising a layer of relatively low coefficient of friction plastic lining the interior of said flexible tubing to reduce friction during the passage therethrough of an electrical conductor.

* * * * *

UNITED STATES PATENT AND TRADEMARK OFFICE
CERTIFICATE OF CORRECTION

PATENT NO. : 5,259,418
DATED : November 9, 1993
INVENTOR(S) : James C. Hamrick

It is certified that error appears in the above-indentified patent and that said Letters Patent is hereby corrected as shown below:

On the Title page, item [54] and col. 1, line, "REGID" should be --RIGID--.
Column 7, line 15, "70" should be -- 71 --.
Column 7, line 49, "90" should be -- 90° --.
Column 9, line 31, before "tubing" insert -- rigid --.

Signed and Sealed this

Seventeenth Day of May, 1994

Attest:

BRUCE LEHMAN

Attesting Officer          Commissioner of Patents and Trademarks